United States Patent
Huang et al.

(10) Patent No.: US 10,855,155 B2
(45) Date of Patent: Dec. 1, 2020

(54) PERMANENT MAGNET LINEAR MOTOR AND LINEAR VIBRATOR

(71) Applicant: Shenzhen Huayi Transmission Technology Co., Ltd., Guangdong (CN)

(72) Inventors: Zhongdong Huang, Guangdong (CN); Yanhui Yin, Guangdong (CN)

(73) Assignee: Shenzhen Huayi Transmission Technology Co., Ltd., Shenzhen (CN)

( * ) Notice: Subject to any disclaimer, the term of this patent is extended or adjusted under 35 U.S.C. 154(b) by 22 days.

(21) Appl. No.: 16/308,454

(22) PCT Filed: Oct. 27, 2017

(86) PCT No.: PCT/CN2017/108125
§ 371 (c)(1),
(2) Date: Dec. 7, 2018

(87) PCT Pub. No.: WO2018/082507
PCT Pub. Date: May 11, 2018

(65) Prior Publication Data
US 2019/0273426 A1  Sep. 5, 2019

(30) Foreign Application Priority Data
Nov. 2, 2016 (CN) .......................... 2016 1 0946781

(51) Int. Cl.
*H02K 33/16* (2006.01)
*H02K 33/00* (2006.01)
(Continued)

(52) U.S. Cl.
CPC ............... *H02K 33/16* (2013.01); *H02K 1/16* (2013.01); *H02K 5/04* (2013.01); *H02K 33/00* (2013.01); *H02K 1/12* (2013.01)

(58) Field of Classification Search
CPC ........ H02K 33/00; H02K 33/02; H02K 33/18; A61H 23/00; A61H 23/02; A61H 23/0218; A61C 17/34; A61C 17/3445
(Continued)

(56) References Cited

U.S. PATENT DOCUMENTS 1,871,446 A * 8/1932 Decker .................. H02K 33/18
                                                            310/27
4,968,225 A * 11/1990 Hashimoto ............. F04B 43/04
                                                            310/17
(Continued)

FOREIGN PATENT DOCUMENTS

| CN | 2935613 Y | 8/2007 |
| CN | 101964578 A | 2/2011 |

(Continued)

OTHER PUBLICATIONS

English machine translation of Hardy, EP2079122 (Year: 2014).*
(Continued)

*Primary Examiner* — Burton S Mullins

(57) ABSTRACT

Disclosed are a permanent magnet linear motor and a linear vibrator, the linear vibrator includes the permanent magnet linear motor, the permanent magnet linear motor includes a stator component, a rotor component and a motor housing (6), the stator component and the rotor component are both mounted in the motor housing (6), the rotor component includes a shaft (1), a supporter (9), and a permanent magnet (2), the supporter (9) is fixedly defined at the middle part of the shaft (1), the permanent magnet (2) is fixedly embedded in the supporter (9); the stator component includes a stator core (4), a frame (11), and a coil winding (8), the stator core (4) is fixedly defined in the motor housing (6), the frame (11)
(Continued)

is formed by defining tooth structure on the stator core (4) along a radial direction, the coil winding (8) is coiled on the frame (11).

10 Claims, 3 Drawing Sheets

(51) Int. Cl.
    *H02K 5/04*     (2006.01)
    *H02K 1/16*     (2006.01)
    *H02K 1/12*     (2006.01)

(58) Field of Classification Search
    USPC .................... 310/12.24, 12.27, 12.33, 15
    See application file for complete search history.

(56) References Cited

U.S. PATENT DOCUMENTS

| | | | | |
|---|---|---|---|---|
| 6,184,597 | B1 * | 2/2001 | Yamamoto | H02K 33/16 310/14 |
| 6,930,414 | B2 * | 8/2005 | Qiu | H02K 35/06 310/12.25 |
| 6,994,679 | B1 * | 2/2006 | Lee | A61H 23/0218 601/15 |
| 7,185,431 | B1 * | 3/2007 | Seagar | F04B 35/045 29/434 |
| 7,218,018 | B2 * | 5/2007 | Hasegawa | H02K 33/16 310/112 |
| 7,686,597 | B2 * | 3/2010 | Ries | H02K 1/28 310/15 |
| 8,174,371 | B2 * | 5/2012 | Schwieger | A46B 13/023 340/407.1 |
| 8,680,723 | B2 * | 3/2014 | Subramanian | H02K 33/06 310/12.01 |
| 9,325,230 | B2 * | 4/2016 | Yamada | H02K 33/16 |
| 2005/0023905 | A1 | 2/2005 | Sakamoto | |
| 2006/0028072 | A1 | 2/2006 | Iwasa et al. | |
| 2008/0252150 | A1 * | 10/2008 | Grundl | H02K 33/16 310/12.22 |
| 2011/0101796 | A1 | 5/2011 | Odajima et al. | |
| 2012/0227269 | A1 | 9/2012 | Subramanian et al. | |
| 2014/0042832 | A1 | 2/2014 | Wang et al. | |
| 2015/0148718 | A1 * | 5/2015 | Eigler | A61H 19/44 601/46 |

FOREIGN PATENT DOCUMENTS

| | | | | |
|---|---|---|---|---|
| CN | 102684445 | A | 9/2012 | |
| CN | 105680664 | A | 6/2016 | |
| CN | 105796300 | A | 7/2016 | |
| CN | 205430024 | U | 8/2016 | |
| CN | 205509832 | U | 8/2016 | |
| CN | 106320838 | A | 1/2017 | |
| CN | 106374714 | A | 2/2017 | |
| CN | 106451990 | A | 2/2017 | |
| CN | 206211812 | U | 5/2017 | |
| CN | 206211813 | U | 5/2017 | |
| CN | 206503443 | U | 9/2017 | |
| EP | 2709122 | A1 * | 3/2014 | H01F 7/15 |
| WO | 2016017585 | A1 | 2/2016 | |

OTHER PUBLICATIONS

English machine transition of Yibiao et al. CN105680664 (Year: 2016).*

International Search Report of PCT Patent Application No. PCT/CN2017/108125 dated Jan. 25, 2018.

Search Report of counterpart European Patent Application No. 17867333.1 dated Oct. 16, 2019.

* cited by examiner

PERMANENT MAGNET LINEAR MOTOR AND LINEAR VIBRATOR

CROSS-REFERENCE TO RELATED APPLICATIONS

The present application is the National Stage of International Application PCT/CN2017/108125, filed Oct. 27, 2017, which claims the benefit of China Patent Application No. CN201610946781.2, filed Nov. 2, 2016, with the State Intellectual Property Office and entitled "permanent magnet linear motor and linear vibrator", the entirety of which is hereby incorporated herein by reference.

TECHNICAL FIELD

The present disclosure relates to the field of permanent magnet linear motor and its application, and more particularly relates to a permanent magnet linear motor and a linear vibrator.

BACKGROUND

Linear vibrator is a kind of device that converts electrical energy into mechanical vibration through the principle of generating electromagnetic force. For example, leaf spring linear vibrators are commonly used in mobile phones, tablet PCs or portable electronic devices due to their long life and short response times.

Currently, linear actuators have a limited increase of the amount of vibration due to the size limitation and motor limitation of the linear actuators.

Coil winding of the permanent magnet linear motor generates electromagnetic force after being energized, cooperating with magnetic force of permanent magnet to drive a shaft of motor to reciprocate linearly. The permanent magnet motor in the prior art usually uses inner and outer iron cores to solve the overall magnetic circuit of the motor. The presence of the inner and outer iron cores enlarges the air gap between the iron core and the permanent magnet, and the air gap between the iron cores, which results that the motor is large in volume, large in air gap, and the magnetic circuit of the motor is incomplete. A incomplete magnetic circuit would result in insufficient utilization of magnetic and electromagnetic force, and a low motor power and efficiency.

SUMMARY

It is therefore one main object of the present disclosure to provide a permanent magnet linear motor and a linear vibrator, aiming to narrow the air gap between stator core and the permanent magnet, and the air gap between one stator core and the other stator cores by adopting the permanent magnet as a magnetic source, to form a complete magnetic circuit for improving the effective power and working efficiency of the motor.

To achieve the above object, the present disclosure provides the following technical solutions.

The present disclosure provides a permanent magnet linear motor, which includes a stator component, a rotor component, and a motor housing, the stator component and the rotor component are both mounted in the motor housing;

the rotor component includes a shaft, a supporter, and a permanent magnet, two ends of the shaft respectively extends out of a motor, the supporter is mounted at the middle part of the shaft, the permanent magnet is fixedly embedded in the supporter;

the stator component includes a stator core, a frame, and a coil winding, the stator core is mounted in the motor housing, the frame is formed by defining tooth structure on the stator core along a radial direction, the coil winding is coiled on the frame.

Preferably, in the motor housing, two first cover received are defined at two ends of the stator component respectively, the first covers are fixed at the two ends of the stator component respectively.

Preferably, two second covers are respectively defined at two ends of the motor housing, the middle part of the second cover defines a hole, two ends of the shaft respectively pass through the holes.

Preferably, two sides of the supporter both defines a prop paralleled to the shaft, each of the props defines a guide hole for receiving a guide rail, two ends of each of the guide rails pass through the supporter, to respectively resist on the second covers.

Preferably, the permanent magnet is a single layer structure or a multi-layers structure, the permanent magnet is layered along an axial direction, the stator core is formed by stamping a silicon steel sheet, and the stator core includes at least two tooth structures.

The present disclosure also provides a linear vibrator, which includes a vibrator having the permanent magnet linear motor.

Preferably, the linear vibrator further includes a vibrator housing, one end of the vibrator housing defines a vibrating member.

Preferably, one end of the shaft of the permanent magnet linear motor is connected with a connecting rod, the other end of the connecting rod is connected with a vibrating core, the vibrating core is connected with the vibrating member.

Preferably, the vibrating core and the vibrating member both have a flat plate structure, the vibrating core is connected with the vibrating member through a vibrating spring.

Preferably, the linear vibrator further includes a power module and a control module both received in the vibrator housing, the control module is connected with the permanent magnet linear motor.

Compared to the existing technology, the permanent magnet linear motor and the linear vibrator provided by the present disclosure have the following advantageous:

1) the permanent magnet linear motor and the linear vibrator provided by the present disclosure both adopt the permanent magnet as a magnetic source, after the surfaces of two poles of the permanent magnet are arranged to leave reasonable air gaps, the permanent magnet is arranged corresponding to the stator component, to effectively narrow the air gap between the stator core and the permanent magnet, and that between one stator core and the other stator cores, a complete magnetic circuit is formed by fully using of the generated electromagnetic energy, so as to improve the effective power and working efficiency of the motor, and to solve the deficiencies of the existing motor, such as large size, large air gap, low utilization rate of magnetic and electromagnetic forces due to the incomplete magnetic circuit.

2) for the permanent magnet linear motor and the linear vibrator provided by the present disclosure, the permanent magnet can be embedded in the supporter of the shaft to integrate with the supporter, and the coil winding coils around the stator core to form the stator component, the stator is fixed in the housing, as such the magnetic force of the permanent magnet is uniform, and the air gap between the rotor component and the stator component is effectively narrowed, therefore, the permanent magnet linear motor and the linear vibrator have the features of small size, large power, low power consumption, and high efficiency.

3) the stator core of the permanent magnet linear motor and the linear vibrator provided by the present disclosure includes at least two tooth structures, the tooth structures are overlaid to form the multitooth stator core, the number of the multitooth stator core is a multiple of 1, and the multitooth stator cores are arranged in groups corresponding to the two poles of the permanent magnet; according to the power of the motor and the requirement of the dimension of the motor, it can be chosen that the coil winding coils around a portion of the supporter on the yoke of the stator core along the axial direction or coils around a portion of the supporter on the tooth of the stator core along the radial direction, or the stator core coils around a portion of the supporter with its grooves of teeth in the same layer on the stator cores along a peripheral direction, etc; the permanent magnet is a single layer structure or a multi-layers structure, and has a flat plate structure. The multi-layers permanent magnet is layered along an axial direction, For the multi-layers permanent magnet of the motor, each layer of the permanent magnet can be alternately and reversely magnetized, to form multiple reversing fields, the reversing fields interact with the electromagnetic force generated by each pole of the stator core, to realize the push and pull functions of the rotor component, finally forming a complete motor power system, so as to improve the working efficiency of the motor.

4) in the permanent magnet linear motor and the linear vibrator provided by the present disclosure, two ends of the stator component are both defined with a second cover received in the motor housing, as such the first covers are mounted at the two ends of the stator component respectively to realize the function of positioning and fixing, for preventing the stator component from being moved or loosened; two ends of the guide rail located in the supporter are locked by the second covers, to prevent the guide rail from being loosened or moved along the axial direction, as such the rotor component of the motor can be guided and positioned; the spring coils around the end of the guide rail (or a silicone pad is defined at the end of the guide rail), to enforce and push a back-and-forth linear movement of the rotor component, and further improving the working efficiency of the motor.

BRIEF DESCRIPTION OF THE DRAWINGS

Another technical feature, aim, and the advantages of the present disclosure would be more clearly by reading the detail description of the drawing for the nonrestrictive exemplary embodiments.

Figure 1:
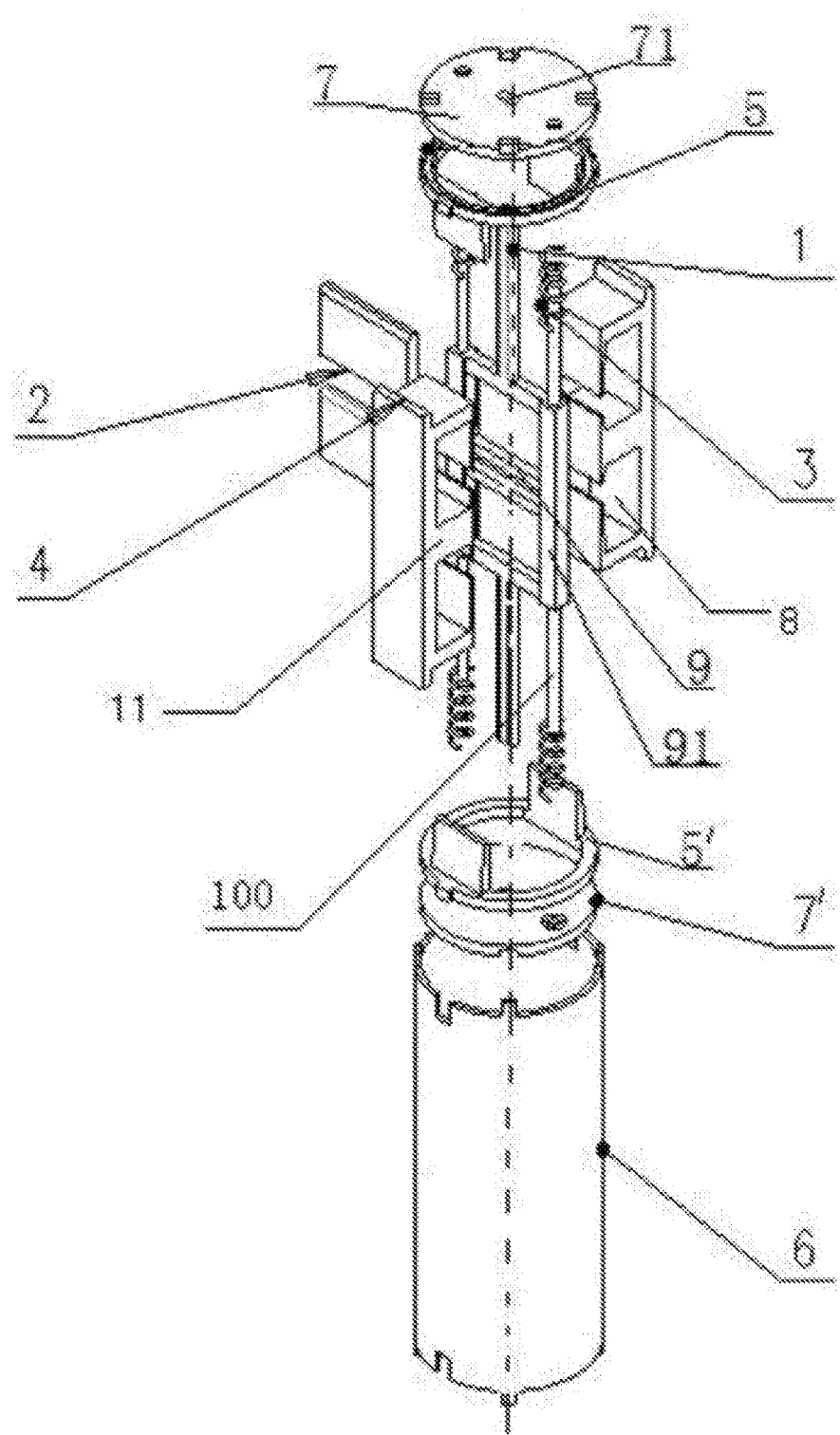
FIG. 1 is an exploded diagram of the permanent magnet linear motor according to an exemplary embodiment of the present disclosure.

1—shaft; 2—permanent magnet; 3—spring; 4—stator core; 5—second cover; 5'—first cover; 6—motor housing; 7—third cover; 7'—fourth cover; 71—hole; 8—coil winding; 9—supporter; 91—prop; 100—guide rail; 11—frame; 10—permanent magnet linear motor; 20—vibrator housing; 21—expanding portion; 22—vibrating member; 23—displayer; 30—control module; 40—power module; 50—vibrating core; 51—connecting rod.

DETAILED DESCRIPTION OF THE EMBODIMENTS

In order make the realization of the aim, the technical solutions, and the advantages of the present disclosure more clearly, the technical solutions of the embodiments of the present disclosure will be clearly and completely described in the following with reference to the accompanying drawings. It is obvious that the embodiments to be described are only a part rather than all of the embodiments of the present disclosure. The components of the embodiments of the present disclosure shown in figures can be arranged and designed by various configurations. Therefore, the detail description of the embodiments of the present disclosure provided by the figures are not intended to limit the patentable scope of the disclosure, and are merely used for presenting selected embodiments of the present disclosure. Based on the exemplary embodiments of the present disclosure, other embodiments obtained by persons skilled in the art based on the embodiments of the present disclosure without creative efforts shall fall within the protection scope of the present disclosure.

In the description of the present disclosure, it is to be understood that, the orientation or position relations indicated by the terms, such as "center", "top", "down", "inside", "outside" . . . , can only be the orientation or position relations based on the figures, the terms are merely used for explaining the present disclosure and simplifying the description, and cannot be used for indicating that the device or component must have the specific orientation, or must be constructed and operated in a particular direction. Therefore, the present invention cannot be limited by the terms. In addition, the terms, such as the "first", the "second" in the present disclosure, can only be used for describing the aim of description, and cannot be understood as indicating or suggesting relative importance or impliedly indicating the number of the indicated technical character.

In the description of the present disclosure, it is also important to be understood that, unless otherwise specified and defined, the terms, such as "set", "mount", "connect" and "link", should be understood broadly, such as, they mean that components are fixedly connected, detachably connected, or integrally connected; they also mean that components are mechanically connected, electrically connected; or they mean that components are connected directly, or connected through a middle component, or the interior of the components are connected with each other. The skilled person in the art can understand the detail meanings of the terms in the present disclosure according to the detail situations.

In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

The present disclosure will be clearly and completely described in the following with reference to the accompanying drawings and the exemplary embodiments, if the detail descriptions of the existing technology are not necessary for the characters of the present disclosure, please omit them.

FIG. 1 is an exploded diagram of the permanent magnet linear motor according to an exemplary embodiment of the present disclosure, the permanent magnet linear motor includes a stator component, a rotor component and a motor housing 6, the stator component and the rotor component are both mounted in the motor housing 6.

The rotor component includes a shaft 1, a supporter 9, and a permanent magnet 2. Two ends of the shaft 1 respectively extends out of a motor, the supporter 9 is fixedly defined at the middle part of the shaft 1, the permanent magnet 2 is fixedly embedded in the supporter 9, the permanent magnet 2 is integrated with the supporter 9.

The stator component includes a stator core 4, a frame 11, and a coil winding 8, the stator core 4 is mounted in the motor housing 6, the frame 11 is formed by defining tooth structure on the stator core 4 along a radial direction, the coil winding 8 is coiled on the frame 11, the coil winding 8 coils around the frame 11 located at a surface of the stator core 4, to form the stator component.

The rotor component is spaced with the stator component, as such there is a gap between the rotor component and the stator component. The magnetic force of the permanent magnet 2 of the motor structure of the present disclosure is uniform, and the air gap between the rotor component and the stator component is effectively narrowed. The gap between the rotor component and the stator component can be 0.2 mm-0.5 mm. A first cover 5 and a second cover 5' which are both mounted in the motor housing 6 are defined at two ends of the stator component respectively. The first cover 5 and the second cover 5' are fixed at the two ends of the stator component respectively to realize the function of positioning and fixing, for preventing the stator component from being moved or loosened, and avoiding the problems and hidden troubles occurred in the operating of the motor.

A third cover 7 and a fourth cover 7' are respectively defined at two ends of the motor housing 6. The third cover 7 and the fourth cover 7' are fixed with the motor housing 6 to form an inner space, which is configured to receive the stator component and the rotor component, to form a complete linear motor. And, the middle part of the second cover define a hole 71, two ends of the shaft 1 respectively pass through the holes 71, to extend out of the permanent magnet linear motor.

Two sides of the supporter 9 both defines a prop 91 paralleled to the shaft 1, each of the props 91 defines a guide hole for receiving a guide rail 100, two ends of each of the guide rails 100 pass through the prop 91 of the supporter 9, to resist on the third cover 7 and the fourth cover 7'. Two ends of the guide rail 100 are fixed in the third cover 7 and the fourth cover 7' respectively, and do not pass through the third cover 7 and the fourth cover 7', to prevent the guide rail from being loosened or moved along the axial direction, as such the rotor component of the motor can be guided and positioned.

Preferably, an end of the guide rail 100 is sleeved by a spring 3 (or a silicone pad is defined at the end of the guide rail), the spring 3 coils around the guide rail 100 to enforce and push a back-and-forth linear movement of the rotor component, and further improving the working efficiency of the motor.

The permanent magnet 2 is a single layer structure or a multi-layers structure, and has a flat plate structure. In detail, the number of the permanent magnet 2 and the number of the layers of the permanent magnet 2 can be adjusted according to the motor power and the dimension of the motor. For the multi-layers permanent magnet of the motor, each layer of the multi-layers permanent magnet can be alternately and reversely magnetized, to form multiple reversing fields, the reversing fields interact with the electromagnetic force generated by each pole of the stator core 4, to realize the push and pull functions of the rotor component, and finally forming a complete motor power system.

The stator core 4 is formed by stamping a silicon steel sheet, and the stator core 4 includes at least two tooth structures, the tooth structures are overlaid to form the multitooth stator core, the tooth structure of the stator core 4 can be defined as the frame 11, the multitooth stator core is arranged corresponding to the two poles of the permanent magnet 2, the coil winding 8 coils around the frame 11, according to the power needed by the motor and the requirement of the dimension of the motor, it can be chosen that the coil winding 8 coils around the yoke of the stator core 4 along the axial direction, or coils around the tooth on the stator core 4 along the radial direction, or the stator core 4 coils around the grooves of the teeth on the stator core 4 in the same layer along a peripheral direction, etc.

There is at least one group of the stator core 4, which can be adjusted according to the power needed by the motor and the requirement of the dimension of the motor, after the coil winding is electrified, each series coil and each parallel coil are electrified to form an induced magnetic field which can interact with the magnetic field of the permanent magnet 2, to drive the rotor component to produce an oscillatory and reciprocating motion, so as to bring the shaft 1 to reciprocally output power, to form the complete motor power system.

The permanent magnet linear motor of the present disclosure has the complete motor power system, and it can be connected with an external device, such as a cylinder device, through the two ends of the shaft 1, to realize the reciprocating compression and reciprocating pushing of the cylinder device, the permanent magnet linear motor is efficient and low consumption, and can be applied to an engine, a compressor, an air pump, an oil pump, a water pump, a telescopic manipulator, a vibration equipment, and all kinds of locks.

Figure 2:
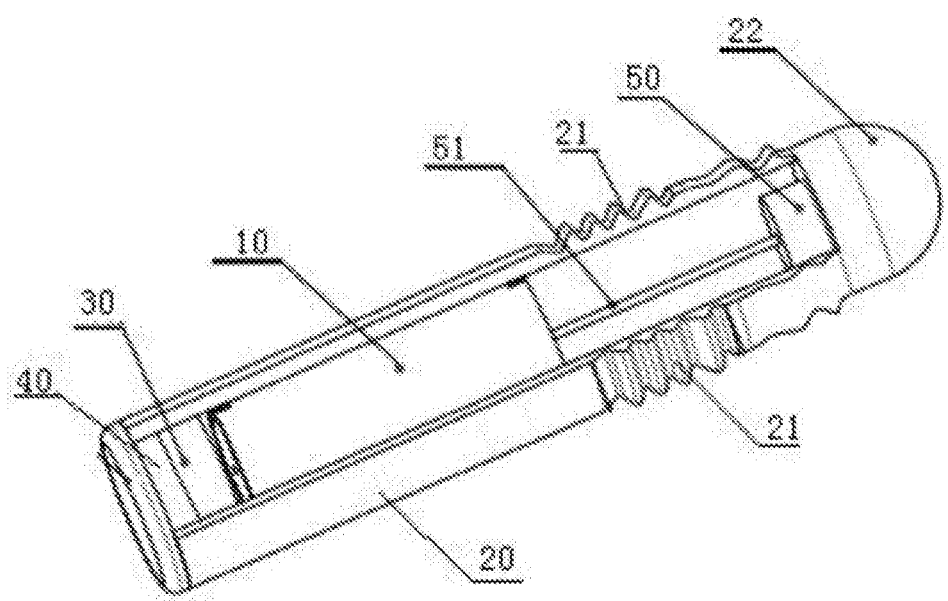
FIG. 2 is a structural diagram of the linear vibrator according to an exemplary embodiment of the present disclosure.

FIG. 2 is a structural diagram of the linear vibrator according to an exemplary embodiment of the present disclosure, the linear vibrator can be applied to an adult product, such as a vibrating spear. In the exemplary embodiment, the linear vibrator includes the permanent magnet linear motor 10 and a vibrator housing 20. A portion of one end of the shaft 1 (not shown) extends out of the permanent magnet linear motor 10, to connect with a connecting rod 51, the other end of the connecting rod 51 is connected with a vibrating core 50. One end of the vibrator housing 20 defines a vibrating member 22, the vibrating member 22 is connected with the vibrating core 50 to receive a vibratory force outputted by the vibrating core 50.

The vibrator further includes a power module 40 and a control module 30 both received in the vibrator housing 20, the control module 30 is connected with the permanent magnet linear motor and controls the permanent magnet linear motor.

The vibrator housing 20 is made of silica gel, and defines an expanding portion 21, referring to FIG. 2, the expanding portion 21 is located at a side surface of the vibrator housing 20, the expanding portion 21 can enable the vibrator housing 20 to deform much better in the back-and-forth linear movement, to achieve the vibrating effect.

Figure 3:
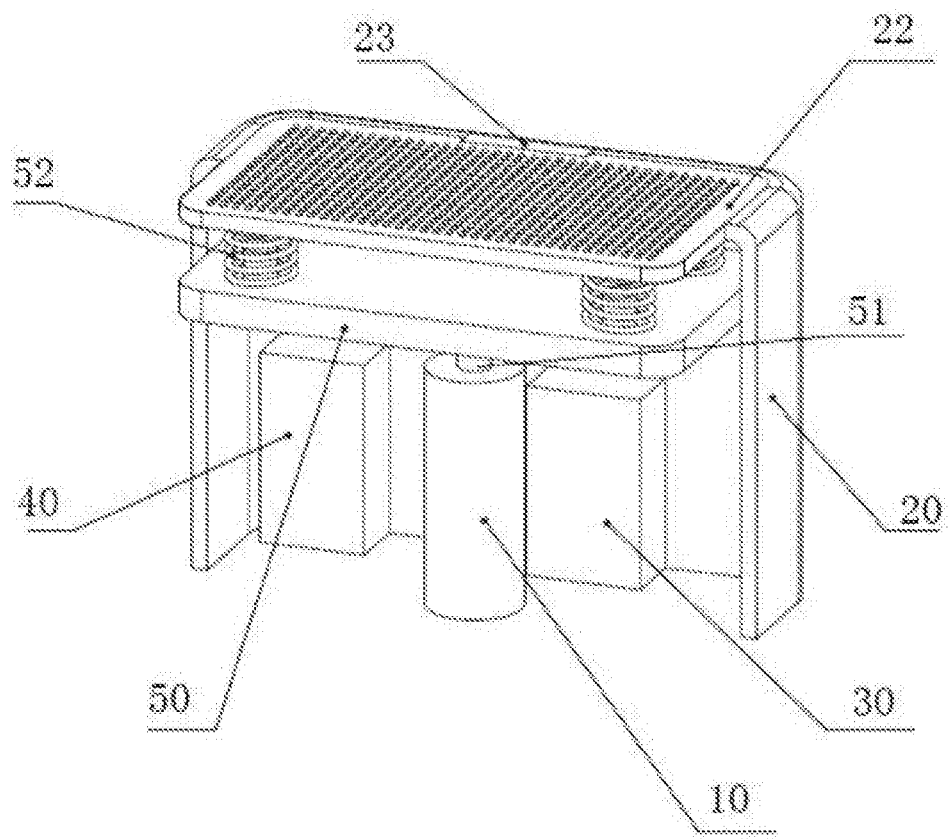
FIG. 3 is a structural diagram of the linear vibrator according to another exemplary embodiment of the present disclosure.

FIG. 3 is a structural diagram of the linear vibrator according to another exemplary embodiment of the present disclosure, the linear vibrator can be applied to a fitness vibrating equipment. In the exemplary embodiment, a vibrating core 50 of the linear vibrator is connected with the permanent magnet linear motor 10 through a connecting rod 51, the vibrating core 50 has a flat plate structure, the vibrating core 50 can be regarded as a power switch board of the permanent magnet linear motor and can transfer and convert the energy of the motor much better. The vibrating member 22 can also have a flat plate structure, in the exemplary embodiment, the vibrating member 22 can be regarded as a massage vibrating platform, the vibrating core 50 can be connected with the vibrating member 22 through the vibrating spring 52. Preferably, the vibrating spring 52 can be two pairs of springs which are symmetrically arranged, the vibration force of the vibrating core 50 can be transferred much better through the spring, as such the vibrating member 22 can achieve a better vibrating or massage effect.

In the exemplary embodiment, a displayer 23 can be defined on the flat vibrating member 22, the displayer 23 is connected with the control module 30 to display the data of the vibrator, such as, a number of vibration, a vibration frequency, calories burned by body, indoor temperature, etc.

The vibrator of the present disclosure can produce the oscillatory and reciprocating motion by utilizing a linear motor principle of motor, the vibrator can be preferably applied to the adult products, such as the vibrating spear, the fitness vibrating equipment, etc, it can also be applied to household appliances, such as, an electric toothbrush, all kinds of beauty apparatus, etc.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A permanent magnet linear motor comprising a stator component, a rotor component, and a motor housing (6), the stator component and the rotor component being both mounted in the motor housing (6); wherein,
   the rotor component comprises a shaft (1), a supporter (9), and a permanent magnet (2), two ends of the shaft (1) respectively extend out of the motor, the supporter (9) is fixedly defined on the middle part of the shaft (1), the permanent magnet (2) is fixedly embedded in the supporter (9);
   the stator component comprises a stator core (4), a frame (11), and a coil winding (8), the stator core (4) is mounted in the motor housing (6), the frame (11) is formed by defining tooth structure on the stator core (4) along a radial direction, the coil winding (8) is coiled on the frame (11);
   a third cover (7) and a fourth cover (7') are respectively defined at two ends of the motor housing (6), the middle part of the third cover (7) and that of the fourth cover (7') both define a hole (71), two ends of the shaft (1) respectively pass through the holes (71);
   two sides of the supporter (9) both define a prop (91) parallel to the shaft (1), each of the props (91) defines a guide hole for receiving a guide rail (100), two ends of each of the guide rails (100) pass through the supporter (9), to respectively rest on the third cover (7) and the fourth cover (7').

2. The permanent magnet linear motor of claim 1, wherein in the motor housing (6), a first cover (5) and a second cover (5') are defined at two ends of the stator component respectively, the first cover (5) and the second cover (5') are fixed at the two ends of the stator component respectively.

3. The permanent magnet linear motor of claim 1, wherein the permanent magnet (2) is a single layer structure or a multi-layered structure, the stator core (4) is formed by stamping a silicon steel sheet, and the stator core (4) comprises at least two tooth structures.

4. A linear vibrator comprising a permanent magnet linear motor, a vibrator housing (20), a power module (40) and a control module (30) both received in the vibrator housing (20), one end of the vibrator housing (20) defining a vibrating member (22), the control module (30) being connected with the permanent magnet linear motor, the permanent magnet linear motor comprising a stator component, a rotor component, and a motor housing (6), the stator component and the rotor component being both mounted in the motor housing (6); wherein,
   the rotor component comprises a shaft (1), a supporter (9), and a permanent magnet (2), two ends of the shaft (1) respectively extend out of the motor, the supporter (9) is fixedly defined on the middle part of the shaft (1), the permanent magnet (2) is fixedly embedded in the supporter (9);
   the stator component comprises a stator core (4), a frame (11), and a coil winding (8), the stator core (4) is mounted in the motor housing (6), the frame (11) is formed by defining tooth structure on the stator core (4) along a radial direction, the coil winding (8) is coiled on the frame (11);
   a third cover (7) and a fourth cover (7') are respectively defined at two ends of the motor housing (6), the middle part of the third cover (7) and that of the fourth cover (7') both define a hole (71), two ends of the shaft (1) respectively pass through the holes (71);
   two sides of the supporter (9) both define a prop (91) parallel to the shaft (1), each of the props (91) defines a guide hole for receiving a guide rail (100), two ends of each of the guide rails (100) pass through the supporter (9), to respectively rest on the third cover (7) and the fourth cover (7').

5. The linear vibrator of claim 4, wherein one end of the shaft of the permanent magnet linear motor (10) is connected with a connecting rod (51), the other end of the connecting rod (51) is connected with a vibrating core (50), the vibrating core (50) is connected with the vibrating member (22).

6. The linear vibrator of claim 5, wherein the vibrating core (50) and the vibrating member (22) both comprise a flat plate structure, the vibrating core (50) is connected with the vibrating member (22) through a vibrating spring (52).

7. The linear vibrator of claim 6, wherein the linear vibrator further comprises a power module (40) and a control module (30) both received in the vibrator housing (20), the control module (30) is connected with the permanent magnet linear motor.

8. The linear vibrator of claim 5, wherein the linear vibrator further comprises a power module (40) and a control module (30) both received in the vibrator housing (20), the control module (30) is connected with the permanent magnet linear motor.

9. The linear vibrator of claim 4, wherein in the motor housing (6), a first cover (5) and a second cover (5') are defined at two ends of the stator component respectively, the first cover (5) and the second cover (5') are fixed at the two ends of the stator component respectively.

10. The linear vibrator of claim 4, wherein the permanent magnet (2) is a single layer structure or a multi-layered structure, the stator core (4) is formed by stamping a silicon steel sheet, and the stator core (4) comprises at least two tooth structures.

\* \* \* \* \*